(12) United States Patent
Liu et al.

(10) Patent No.: US 12,515,941 B2
(45) Date of Patent: Jan. 6, 2026

(54) MEMS CHIP WITH A BUFFER AREA AND ELECTRIC DEVICE WITH THE MEMS CHIP

(71) Applicant: Weifang Goertek Microelectronics Co., Ltd., Shandong (CN)

(72) Inventors: Bo Liu, Weifang (CN); Ansheng Wu, Weifang (CN)

(73) Assignee: Weifang Goertek Microelectronics Co. Ltd., Weifang (CN)

( * ) Notice: Subject to any disclaimer, the term of this patent is extended or adjusted under 35 U.S.C. 154(b) by 494 days.

(21) Appl. No.: 17/764,826

(22) PCT Filed: Oct. 9, 2019

(86) PCT No.: PCT/CN2019/110037
§ 371 (c)(1),
(2) Date: Mar. 29, 2022

(87) PCT Pub. No.: WO2021/056607
PCT Pub. Date: Apr. 1, 2021

(65) Prior Publication Data
US 2022/0388836 A1 Dec. 8, 2022

(30) Foreign Application Priority Data
Sep. 29, 2019 (CN) .......................... 201910935020.0

(51) Int. Cl.
*B81B 3/00* (2006.01)
(52) U.S. Cl.
CPC .... *B81B 3/0021* (2013.01); *B81B 2201/0257* (2013.01); *B81B 2203/0127* (2013.01);
(Continued)

(58) Field of Classification Search
None
See application file for complete search history.

(56) References Cited

U.S. PATENT DOCUMENTS

2015/0266723 A1* 9/2015 Chan ........................ H04R 1/08
257/416
2018/0255402 A1* 9/2018 Dehe ...................... H04R 19/04
(Continued)

FOREIGN PATENT DOCUMENTS

CN 205017582 U 2/2016
CN 102244832 A 11/2016
(Continued)

*Primary Examiner* — Sue A Purvis
*Assistant Examiner* — Seyon Ali-Simah Punchbeddell
(74) *Attorney, Agent, or Firm* — Baker Botts LLP

(57) ABSTRACT

Disclosed are a MEMS chip and an electronic device. The chip can include a substrate having a back cavity, as well as a back electrode and an induction membrane both disposed on the substrate, wherein the back electrode and the induction membrane are located on the back cavity and constitute a capacitor structure, the induction membrane comprises an active area opposite to the back cavity, an inactive area disposed outside the active area, and an isolation area located between the active area and the inactive area, and the isolation area comprises two insulation loops connected to the active area and the inactive area respectively, and a buffer area connected between the two insulation loops, both of the insulation loops being disposed around the active area.

8 Claims, 3 Drawing Sheets

(52) U.S. Cl.
CPC ............ *B81B 2203/0315* (2013.01); *B81B 2203/0338* (2013.01); *B81B 2203/0353* (2013.01); *B81B 2203/04* (2013.01); *B81B 2207/03* (2013.01)

(56) References Cited

U.S. PATENT DOCUMENTS

| | | | |
|---|---|---|---|
| 2020/0107130 A1* | 4/2020 | Cheng | H04R 31/003 |
| 2020/0204925 A1* | 6/2020 | Zou | H04R 7/02 |

FOREIGN PATENT DOCUMENTS

| | | |
|---|---|---|
| CN | 108540911 A | 9/2018 |
| CN | 109714690 A | 5/2019 |

\* cited by examiner

MEMS CHIP WITH A BUFFER AREA AND ELECTRIC DEVICE WITH THE MEMS CHIP

CROSS-REFERENCE TO RELATED APPLICATIONS

This application is a National Stage of International Application No. PCT/CN2019/110037, filed on Oct. 9, 2019, which claims priority to Chinese Patent Application No. 201910935020.0, filed on Sep. 29, 2019, both of which are hereby incorporated by reference in their entireties.

TECHNICAL FIELD

The present disclosure relates to the field of microelectromechanical technology, and specifically to a MEMS (Micro-Electro-Mechanical Systems) chip and an electronic device.

BACKGROUND

In an existing MEMS chip (e.g., a MEMS microphone), an insulation loop made of silicon nitride is typically added on the diaphragm in order to reduce parasitic capacitance in a low-vibration area around the diaphragm and improve sensitivity of the MEMS chip. The insulation loop separates the diaphragm into an active area at the center thereof and an inactive area at the periphery of the active area. The inactive area of the diaphragm is connected to a back electrode through an internal circuit, thus achieving an equal potential between the inactive area and the back electrode and eliminating the parasitic capacitance between the two.

This approach, however, creates a potential difference between the active and inactive areas. When a foreign matter from the external environment which has a size larger than the width of the insulation loop falls on the insulation loop, it connects the active and inactive areas together, causing leakage and resulting in poor product quality of the MEMS chip.

Therefore, there is a need for a new technical solution for solving at least one of the above problems.

SUMMARY

An objective of the present disclosure is to provide a new technical solution of a MEMS chip.

According to a first aspect of the present disclosure, a MEMS chip is provided. The chip comprises a substrate having a back cavity, as well as a back electrode and an induction membrane disposed on the both substrate, wherein the back electrode and the induction membrane are located over the back cavity and constitute a capacitor structure, the induction membrane comprises an active area over the back cavity, an inactive area disposed outside the active area, and an isolation area located between the active area and the inactive area, and the isolation area comprises two insulation loops connected to the active area and the inactive area respectively, and a buffer area connected between the two insulation loops, both of the insulation loops being disposed around the active area.

Optionally, the insulation loops are made of silicon nitride or silicon oxynitride.

Optionally, the buffer area is of the same material as the active area.

Optionally, the inactive area and the back electrode are in electrical conduction with each other.

Optionally, the inactive area and the substrate are in electrical conduction with each other.

Optionally, the back electrode comprises a conduction layer and a reinforcement layer located on at least one surface of the conduction layer, and the conduction layer and the reinforcement layer are combined together.

Optionally, the insulation loops are circular rings.

Optionally, two induction membranes are respectively located on an upper side and a lower side of the back electrode: the two induction membranes each form a capacitance structure with the back electrode.

Optionally, a plurality of pads are buried in the substrate, and are respectively connected to the back electrode, the substrate and the induction membranes through conductors located in the substrate.

Optionally, the isolation area comprises two ends disposed adjacent to each other and extending radially, the active area extends outward to form a conduction portion which is disposed between the two ends, and the two ends together with the conduction portion pass through the inactive area.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in the description and constitute a part of the description, illustrate embodiments of the present disclosure and, together with the description thereof, serve to explain the principles of the present disclosure.

DESCRIPTION OF REFERENCE SIGNS

Figure 1:
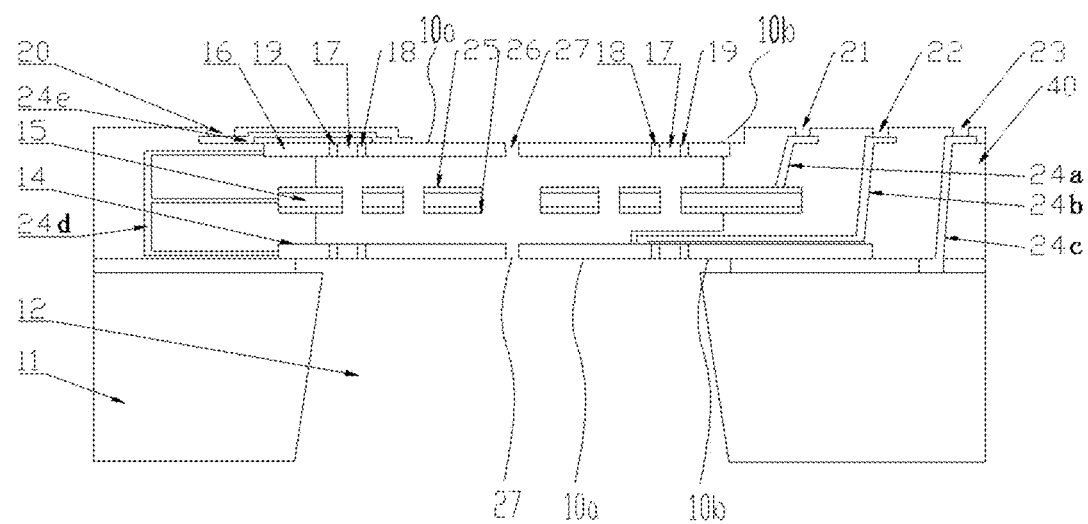
FIG. 1 is a cross-sectional view of a MEMS chip according to an embodiment of the present disclosure.

10a: active area: 10b: inactive area: 11: first substrate: 12: back cavity: 13: conduction portion: 14: second induction membrane: 15: conduction layer: 16: first induction membrane: 17: buffer area: 18: first insulation loop: 19: second insulation loop: 20: first pad: 21: second pad: 22: third pad: 23: fourth pad: 24a: first conductor: 24b: second conductor: 24c: third conductor: 24d: fourth conductor: 24e: fifth conductor: 25: first reinforcement layer: 26: second reinforcement layer: 27: via hole: 28: membrane layer: 29: cavity: 31: through-hole: 40: second substrate.

DETAILED DESCRIPTION

Various exemplary embodiments of the present disclosure will now be described in detail with reference to the accompanying drawings. It should be noted that the relative arrangement, numerical expressions and numerical values of the components and steps set forth in these examples do not limit the scope of the disclosure unless otherwise specified.

The following description of at least one exemplary embodiment is in fact merely illustrative and is in no way intended as a limitation to the present disclosure and its application or use.

Techniques, methods, and apparatus known to those of ordinary skill in the relevant art may not be discussed in detail but where appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

According to one embodiment of the present disclosure, a MEMS chip is provided. The MEMS chip may be a MEMS microphone chip or an environmental sensor chip. An environmental sensor chip may be for example a pressure sensor chip, a temperature sensor chip, a humidity sensor chip, or the like.

Figure 2:
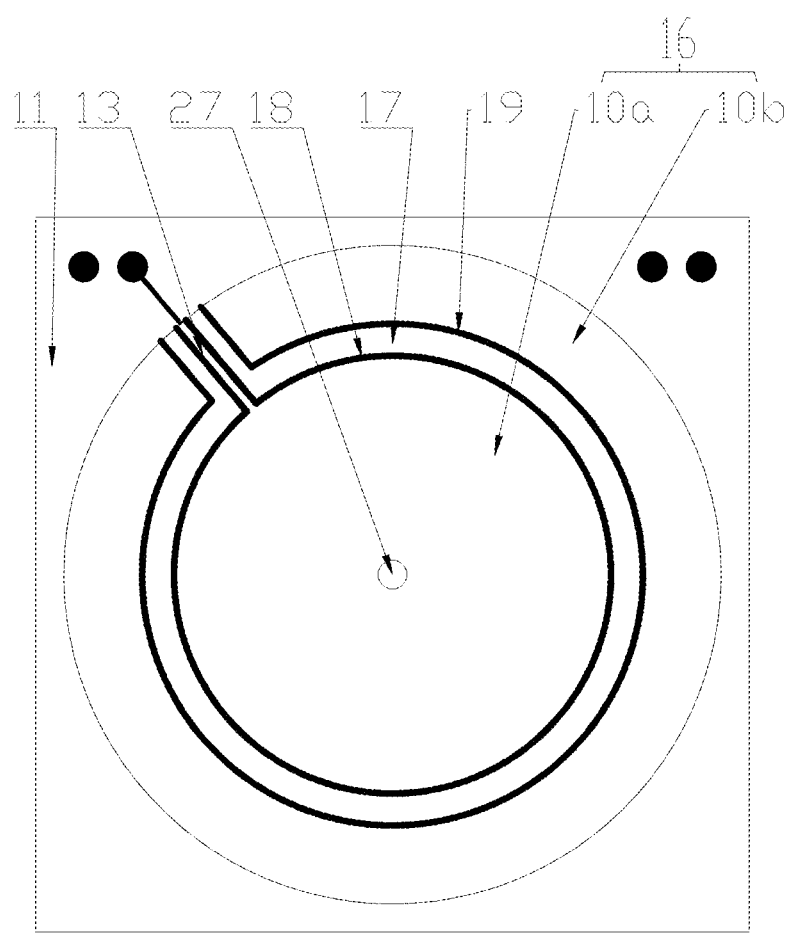
FIG. 2 is a top view of a MEMS chip according to an embodiment of the present disclosure.

FIG. 1 is a cross-sectional view of a MEMS chip according to one embodiment of the present disclosure. FIG. 2 is a top view of a MEMS chip according to one embodiment of the present disclosure.

As shown in FIGS. 1-2, the MEMS chip comprises a first substrate 11 having a back cavity 12, a second substrate 40 disposed on the first substrate 11, as well as a back electrode and an induction membrane both disposed in the second substrate 40. For example, the substrate 11 is a semiconductor material and is formed by vapor deposition. The back cavity 12 is formed on the substrate 11 by etching.

The back electrode and the induction membrane are located over the back cavity 12 and constitute a capacitor structure. The induction membrane comprises an active area 10a over the back cavity 12, an inactive area 10b disposed outside the active area 10a, and an isolation area located between the active area 10a and the inactive area 10b. The active area 10a and the back electrode serve as two electrodes of the capacitor structure respectively.

A via hole 27 is provided on the induction membrane, and is used to balance the air pressure on both sides of the induction membrane.

The isolation area separates the inactive area 10b from the active area 10a to insulate the two from each other. The inactive area 10b and the back electrode are connected by a conductor (for example, a fourth conductor 24d described below). The inactive area 10b is in conduction with the back electrode, that is, the two are isopotential, thereby eliminating the parasitic capacitance between the two.

The isolation area comprises two insulation loops connected to the active area 10a and the inactive area 10b respectively, and a buffer area 17 connected between the two insulation loops 18, 19. Two of the insulation loops 18, 19 are disposed around the active area 10a.

For example, the first insulation loop 18 is connected to the active area 10a. The second insulation loop 19 is connected to the inactive area 10b. The buffer area 17 is connected between the first insulation loop 18 and the second insulation loop 19.

For example, the insulation loops (e.g., the first insulation loop 18, the second insulation loop 19) are made of silicon nitride or silicon oxynitride. The above materials have good insulating effect. The insulation loops (e.g., the first insulation loop 18 and the second insulation loop 19) are circular rings. The circular ring makes the active area 10a circular as a whole. Compared to other shapes, the circular active area 10a is more balanced when vibrating. Of course, the insulation loop may also be an elliptical loop, a racetrack-shaped loop, or the like.

For example, both insulation loops 18, 19 are circular rings and are disposed concentrically. With the concentric arrangement, the connection strength between the active area 10a and the inactive area 10b is higher. The structure of the induction membrane is more balanced. The vibration of the induction membrane can be more balanced.

In other examples, the two insulation loops 18, 19 may also be disposed in an eccentric manner.

In the disclosed embodiment, the isolation area comprises at least two insulation loops 18, 19 and a buffer area 17 located between the two insulation loops 18, 19. In this way, it is possible to significantly increase the radial dimension of the isolation area. In this way, the buffer area 17 can more effectively prevent external impurities of larger size from falling on the isolation area, which leads to conduction between the active area 10a and the inactive area 10b. The buffer area 17 greatly improves the stability of the MEMES chip.

In addition, if increasing the width of the insulation loop to increase the size of the isolation area in the radial direction, the greater size will result in a low strength of the insulation loop due to the poor toughness of the insulation loop itself, such that the MEMS chip has a poor strength in the overall structure and has a poor durability.

In the embodiments of the present disclosure, however, the way that at least two insulation loops 18, 19 are provided and a buffer area 17 located between the two insulation loops 18, 19, is adopted. In this way, on the premise of not increasing the width of the insulation loop, the buffer area 17 can be formed by using a material with high toughness and high durability, so that the width of the isolation area in the radial direction can be increased. In this way, the MEMS chip has better durability and reliability.

For example, the buffer area 17 is made of polysilicon, graphene, or the like. All of the above materials have good toughness and structural strength. The width of the buffer area 17 can be set by those skilled in the art according to actual needs. Width is the dimension in the radial direction.

For example, the buffer area 17 is of the same material as the active area 10a. For example, polysilicon or graphene is used. Due to the same material, the preparation of the induction membrane becomes easy.

In one example, the back electrode, the inactive area 10b and the first substrate 11 are in electrical conduction with each other. For example, the three are conducted through a conductor provided in the first substrate 11.

It is also possible that the back electrode, the first substrate 11 and the inactive area 10b of the induction membrane are in electrical conduction through a conductor located outside the first substrate 11. For example, the three are respectively connected to an external circuit. The external circuit is isopotential so that the three are in electrical conduction with each other.

In this way, the parasitic capacitance among the three can be effectively eliminated.

In one example, the back electrode comprises a conduction layer and a reinforcement layer on at least one surface of the conduction layer. The conduction layer and the reinforcement layer are combined together.

For example, as shown in FIG. 1, the conduction layer is used for conduction, and is made of polysilicon, graphene, or the like. The conduction layer conducts with the external circuit, and is used to hold electric charges. The reinforcement layer is characterized by high structural strength and is made of silicon nitride, silicon nitride, or the like. The conduction layer is provided with a first reinforcement layer 25 on its upper surface and a second reinforcement layer 26 on its lower surface. In this way, the structural strength of the back electrode becomes greater, and the durability of the MEMS chip is good.

Of course, the reinforcement layer may be combined only on one surface of the conduction layer.

Usually, there is one induction membrane of the MEMS chip.

In one example, as shown in FIG. 1, there are two induction membranes, and they are respectively located on an upper side and a lower side of the back electrode. The two induction membranes each form a capacitance structure with the back electrode.

As shown in FIG. 1, the two induction membranes are a first induction membrane 16 and a second induction membrane 14 respectively. The first induction membrane 16 is located above the back electrode, and the second induction membrane 14 is located below the back electrode. Both of the induction membranes are spaced from the back electrode to form vibration spaces. Both of the induction membranes comprise an active area 10a and an inactive area 10b. The active areas 10a of the two induction membranes are both circular and disposed facing each other. The two induction membranes have the same area, and both are provided with via holes 27.

The two induction membranes 14, 16 vibrate in the same direction during operation. In this way, the capacitances formed between the two induction membranes 14, 16 and the back electrode are opposite to each other. After being processed by a ASIC chip, the two capacitive signals can effectively eliminate the noise signal after being superimposed, thereby realizing noise reduction. The two induction membranes 14, 16 enable the MEMS chip to have less noise and higher sensing accuracy.

Here, the noise signal is not limited to a sound signal, but may be an undesired signal that occurs when measuring a pressure signal, a temperature signal, a humidity signal, or the like.

Figure 3:
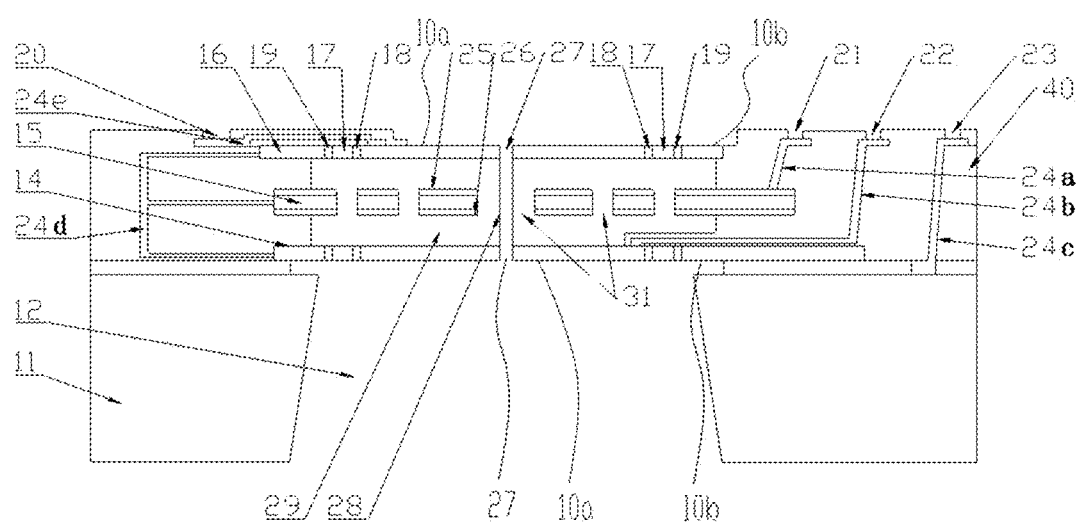
FIG. 3 is a cross-sectional view of an alternative MEMS chip according to an embodiment of the present disclosure.

FIG. 3 is a cross-sectional view of another MEMS chip according to an embodiment of the present disclosure.

As shown in FIG. 3, both of the induction membranes 14, 16 comprise an active area 10a, an inactive area 10b and an isolation area. A via hole 27 is provided in the middle of the two induction membranes 14 and 16. A plurality of via holes are provided on the back electrode. At least one via hole is aligned with the two via holes 27.

The MEMS chip also comprises a cylindrical membrane layer 28 penetrating the two induction membranes and the back electrode along the vibration direction. The cylindrical membrane layer 28 is sealed in the two via holes 27, so that a sealed cavity 29 is formed between the two induction membranes. The channel enclosed by the membrane layer 28 can balance the air pressure inside and outside the back electrode.

In addition, the sensitivity of the MEMS can be adjusted by adjusting the inner diameter of the channel enclosed by the membrane layer 28. For example, when the 30) MEMS chip is a microphone chip, the low frequency sensitivity of the microphone chip can be improved by adjusting the inner diameter of the channel, for example, the low frequency cut-off frequency can reach below 1 KHZ.

The cavity 29 is filled with gas whose viscosity coefficient is smaller than that of air. The gas flows within the cavity rather than being isolated by the back electrode due to the through holes provided on the back electrode. In this way, the gas can effectively reduce the resistance of the gas when the induction membranes 14, 16 vibrate, especially when the gas passes through the through holes. In this way, it can effectively reduce the noise of the MEMS chip and effectively improve the sensitivity of the MEMS chip.

For example, the gas is at least one of isobutane, propane, propylene, H2, ethane, ammonia, acetylene, ethyl chloride, ethylene, $CH_3Cl$, methane, $SO_2$, $H_2S$, chlorine, $CO_2$, $N_2O$, $N_2$.

In other examples, there is air sealed in the cavity 29. The air pressure in the cavity 29 is less than the standard atmospheric pressure, thereby achieving a set vacuum level. For example, the vacuum sealing of the cavity is achieved by encapsulating at the set vacuum level. Since the air pressure inside the cavity is reduced, the viscosity coefficient of the gas inside the cavity can be effectively reduced. Likewise, in this way, it can effectively reduce the noise of the MEMS chip, and effectively improve the sensitivity of the MEMS chip.

A plurality of pads are buried in the second substrate 40. The active area 10a of the first induction membrane 16 is connected to a first pad 20 through a fifth conductor 24e. The back electrode is connected to a second pad 21 through a first conductor 24a. The active area 10a of the second induction membrane 14 is connected to a third pad 22 through a second conductor 24b. The first substrate 11 is connected to a fourth pad 23 through a third conductor 24c. The inactive area 10b of the first induction membrane 16 and the inactive area 10b of the second induction membrane 14 are connected to the back electrode through a fourth conductor 24d to eliminate the parasitic capacitance among the three.

Wherein, the fourth pad 23 and the second pad 21 are respectively connected to two outer pads of the ASIC chip, and the two outer pads are in electrical conduction with each other, so that the back electrode and the first substrate 11 are in electrical conduction with each other and thus form isopotential, thereby avoiding the generation of parasitic capacitance.

In one example, as shown in FIG. 2, the isolation area comprises two ends disposed adjacent to each other. The two ends are spaced apart, and extend radially. The active area 10a extends outward to form the conduction portion 13. The conduction portion 13 is used for conduction between the active area 10a and an external circuit. The conduction portion 13 is located between the two ends. The two ends together with the conduction portion 13 pass through the inactive area 10b.

In this example, the provision of the two ends extending outward and the conduction portion 13 facilitates the connection of the active area 10a to an external circuit.

In addition, the conduction portion 13 can be insulated from the inactive area 10b by the isolation of the two ends.

According to another embodiment of the present disclosure, an electronic device is provided. For example, the electronic device is a mobile phone, a smart watch, an interphone, a computer, a smart box, a VR device, a AR device, a headphone, a smart speaker, a smart screen, an environmental monitoring device, and the like. The electronic device comprises the above-mentioned MEMS chip.

The electronic device has stable quality and good durability.

While certain specific embodiments of the present invention have been illustrated by way of example, it will be understood by those skilled in the art that the foregoing examples are provided for the purpose of illustration and are not intended to limit the scope of the present invention. It will be understood by those skilled in the art that the foregoing embodiments may be modified without departing from the scope and spirit of the invention. The scope of the present invention is subject to the attached claims.

The invention claimed is:

1. A MEMS chip, comprising a first substrate having a back cavity, a second substrate disposed on the first substrate, a back electrode, and at least an induction membrane, wherein the back electrode and the at least an induction membrane are disposed in the second substrate,
wherein the back electrode and the induction membrane are disposed on the back cavity and provide a capacitor structure,
the induction membrane comprises an active area over the back cavity, an inactive area disposed outside the active area, and an isolation area located between the active area and the inactive area,
the isolation area comprises a first insulation loop connected to the active area, a second insulation loop connected to the inactive area, and a buffer area connected between the first and second insulation loops,
two induction membranes are respectively located on an upper side and a lower side of the back electrode; the two induction membranes each form a capacitance structure with the back electrode;
a via hole is provided in middle of the two induction membranes, a plurality of via holes are provided on the back electrode, and at least one via hole is aligned with the two via holes;
the MEMS chip further comprises a cylindrical membrane layer penetrating the two induction membranes and the back electrode along a vibration direction, and the cylindrical membrane layer is sealed in the two via holes so that a sealed cavity is formed between the two induction membranes;
the MEMS chip further comprises a first conductor, a second conductor, a third conductor, a fourth conductor and a fifth conductor which are disposed in the second substrate;
the MEMS chip further comprises a first pad, a second pad, a third pad and a fourth pad which are buried in the second substrate;
the active area of the first induction membrane is connected to the first pad through the fifth conductor, the back electrode is connected to the second pad through the first conductor, the active area of the second induction membrane is connected to the third pad through the second conductor, the first substrate is connected to the fourth pad through the third conductor, and the inactive area of the first induction membrane and the inactive area of the second induction membrane are connected to the back electrode through the fourth conductor.

2. The MEMS chip of claim 1, wherein the first and second insulation loops are made of silicon nitride or silicon oxynitride.

3. The MEMS chip of claim 1, wherein the buffer area is of the same material as the active area.

4. The MEMS chip of claim 1, wherein the back electrode comprises a conduction layer and a reinforcement layer located on at least one surface of the conduction layer, and the conduction layer and the reinforcement layer are combined together.

5. The MEMS chip of claim 1, wherein the first and second insulation loops are circular rings.

6. The MEMS chip of claim 1, wherein the isolation area comprises two ends disposed adjacent to each other and extending radially, the active area extends outward to form a conduction portion which is disposed between the two ends, and the two ends together with the conduction portion pass through the inactive area.

7. An electronic device, comprising the MEMS chip of claim 1.

8. The MEMS chip of claim 1, wherein the sealed cavity is filled with gas whose viscosity coefficient is smaller than that of air.

* * * * *